United States Patent [19]

Pauly et al.

[11] 4,384,693
[45] May 24, 1983

[54] AIRCRAFT WING PROVIDED WITH A HIGH-LIFT SYSTEM IN ITS LEADING EDGE

[75] Inventors: Bernard Pauly; Danilo Ciprian, both of Blagnac, France

[73] Assignee: Societe Nationale Industrielle et Aerospatiale, Paris, France

[21] Appl. No.: 309,233

[22] Filed: Oct. 7, 1981

[30] Foreign Application Priority Data

Oct. 16, 1980 [FR] France ............................... 80 22154

[51] Int. Cl.³ .......................... B64C 21/04; B64C 3/50
[52] U.S. Cl. .................................... 244/207; 244/130; 244/214; 244/218
[58] Field of Search ............... 244/207, 210, 211, 212, 244/214, 218, 130

[56] References Cited

U.S. PATENT DOCUMENTS

| | | | |
|---|---|---|---|
| 2,585,676 | 2/1952 | Poisson-Quinton | 244/212 |
| 3,142,457 | 7/1964 | Quenzler | 244/207 |
| 3,486,720 | 12/1969 | Seglem et al. | 244/210 |
| 3,910,530 | 10/1975 | James et al. | 244/207 |
| 3,968,946 | 7/1976 | Cole | 244/130 |
| 4,189,121 | 2/1980 | Harper et al. | 244/214 |

FOREIGN PATENT DOCUMENTS 669175 3/1952 United Kingdom ................ 244/218

Primary Examiner—Charles E. Frankfort
Attorney, Agent, or Firm—Merriam, Marshall & Bicknell

[57] ABSTRACT

The invention relates to aircraft wings, wherein the fairing element between the leading edge of a wing and the fuselage comprises a streamlining flap movable between a folded position in which it is housed in a recess in the fairing element and forms a part of the leading edge and the part adjacent the lower surface of said fairing element, and an extended position in which it ensures continuity of the leading edge between the fuselage and the high-lift spoiler likewise in extended position. Moreover, there is a communication between the housing of the streamlining flap and the housing of the high-lift spoiler so that, when these two flap elements are in their extended positions, the air penetrating in the housing of the streamlining flap disposed on the lower surface side emerges through the housing of the high-lift spoiler disposed on the upper surface side, with the result that there is an increased upper surface blowing.

7 Claims, 7 Drawing Figures

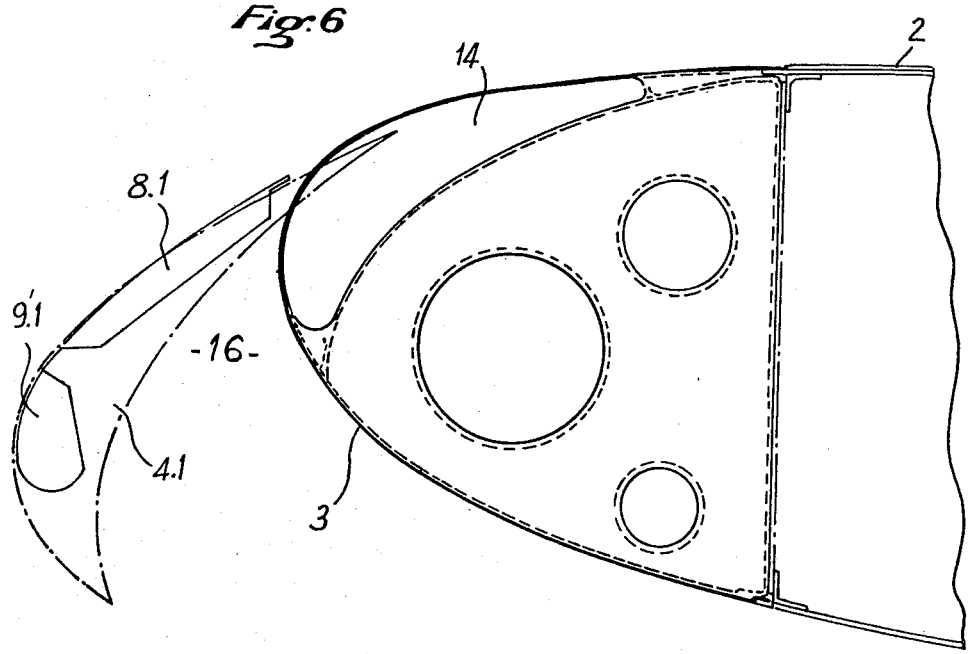
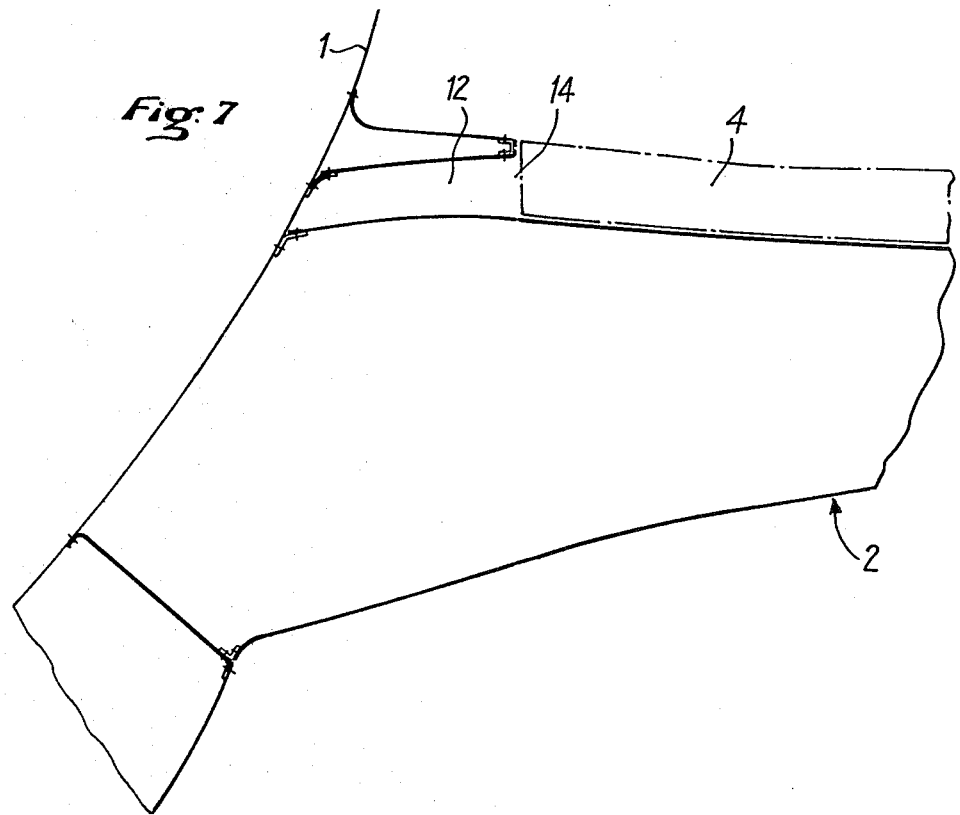

AIRCRAFT WING PROVIDED WITH A HIGH-LIFT SYSTEM IN ITS LEADING EDGE

The present invention relates to an aircraft wing provided with a high-lift system in its leading edge and to an aircraft comprising such a wing.

To increase their lift upon take-off, landing or when stacking, certain aircraft, particularly wide-body aircraft, are known to be provided with high-lift systems in the leading edges of their wings.

These systems are generally disposed over the whole length of the leading edge, up to the vicinity of join of the wing on the fuselage. They are housed in recesses in the wings and form a part of the leading edge and the part adjacent the upper surface thereof, in folded position. In extended, high-lift position, they project forwardly of said leading edge of the wings, forming an air-blowing slot between their lower surface and the upper surface of the wings. They comprise spoilers or flaps and a mechanism ensuring passage from one configuration of said spoilers to the other (smooth configuration of the wing, and high-lift configuration).

While being close to the fuselage, these high-lift spoilers are separated therefrom by fairing element which constitute the volume of connection between the wings and the fuselage in the zone of the leading edge. The main function of such fairing elements is to improve the fluid flow over the whole zone of join of the wings on the fuselage when these wings are in smooth configuration, i.e. when said high-lift spoilers are folded.

On the contrary, when the wings are in take-off or landing configuration, i.e. when said high-lift spoilers are extended, a discontinuity of the leading edge occurs between each fairing element and the adjacent spoiler, due to the advance of said spoilers, with the result that the aerodynamic performances are reduced.

It is an object of the present invention to remedy this drawback and to improve the efficiency of the leading edge high-lift spoilers in the zone of connection of the wings and the fuselage.

To this end, according to the invention, the aircraft wing provided, in its leading edge, with a high-lift system of which part is disposed in the vicinity of the join of said wing to the fuselage of the aircraft, but separated from said fuselage by a fairing element improving the air flow on the zone of connection of said wing when it is in smooth configuration, said system comprising at least one high-lift spoiler movable between a folded position in which it is housed in a recess in the wing and forms part of the leading edge and the part adjacent the upper surface of said wing, and an extended high-lift position in which said spoiler projects forwardly of said leading edge, making an air blowing slot between its lower surface and the upper surface of said wing, is noteworthy in that, on the one hand, said fairing element comprises, in its leading edge, a streamlining flap movable between a folded position in which it is housed in a recess in the fairing element and forms a part of the leading edge and the part adjacent the lower surface of said fairing element, and an extended position in which it ensures continuity of the leading edge between the fuselage and the high-lift spoiler likewise in extended position and in that, on the other hand, a communication is provided between the housing of the streamlining flap and the housing of the high-lift spoiler so that, when these two flap elements are in their extended positions, the air penetrating in the housing of the streamlining flap disposed on the lower surface side emerges through the housing of the high-lift spoiler disposed on the upper surface side, with the result that there is an increased upper surface blowing in the vicinity of the fuselage.

Thus, due to the present invention, the continuity of the leading edge between the high-lift spoiler and the fuselage is ensured in the take-off, landing or stacking configuration;

the upper surface in the vicinity of the fuselage is suitably blown.

In order to ensure upper surface blowing of the wing up to the fuselage, the opening of the streamlining flap housing in the leading edge preferably extends substantially from the fuselage to the high-lift spoiler, communication between the two housings is made through almost the whole of the wall of the high-lift spoiler housing adjacent the fairing element and this wall extends substantially from the leading edge up to the fuselage. In this way, the inlet and outlet for the upper surface blowing air, respectively constituted by said opening of the housing of the streamlining flap and said wall of the high-lift spoiler housing, are opposite, although inclined differently with respect to the axis of the fuselage and the flow of blowing air is parallel to said axis and close to the fuselage.

The control of the streamlining flap may be connected to that of the high-lift spoiler, or, on the contrary, may be independent thereof.

In order to be able to follow as best possible the curvature of the high-lift spoiler, the streamlining flap comprises hinged elements may be folded into retracted position. Such a structure of the streamlining flap further makes it possible to increase the surface thereof in extended configuration.

Thus, a fixed-wing aircraft according to the invention comprises two wings of the type described hereinabove, which are symmetrical with respect to the longitudinal axis of the fuselage.

The invention will be more readily understood on reading the following description with reference to the accompanying drawings, in which:

FIG. 1 is a view partly showing the root of a wing, on the leading edge side, and the adjacent part of the fuselage, according to a known embodiment.

FIG. 2 corresponds to FIG. 1, but includes the improvement according to the invention.

FIGS. 4, 5, 6 and 7 are sections respectively along lines IV—IV, V—V, VI—VI and VII—VII of FIG. 2.

In these figures, like references denote like elements.

Figure 1:
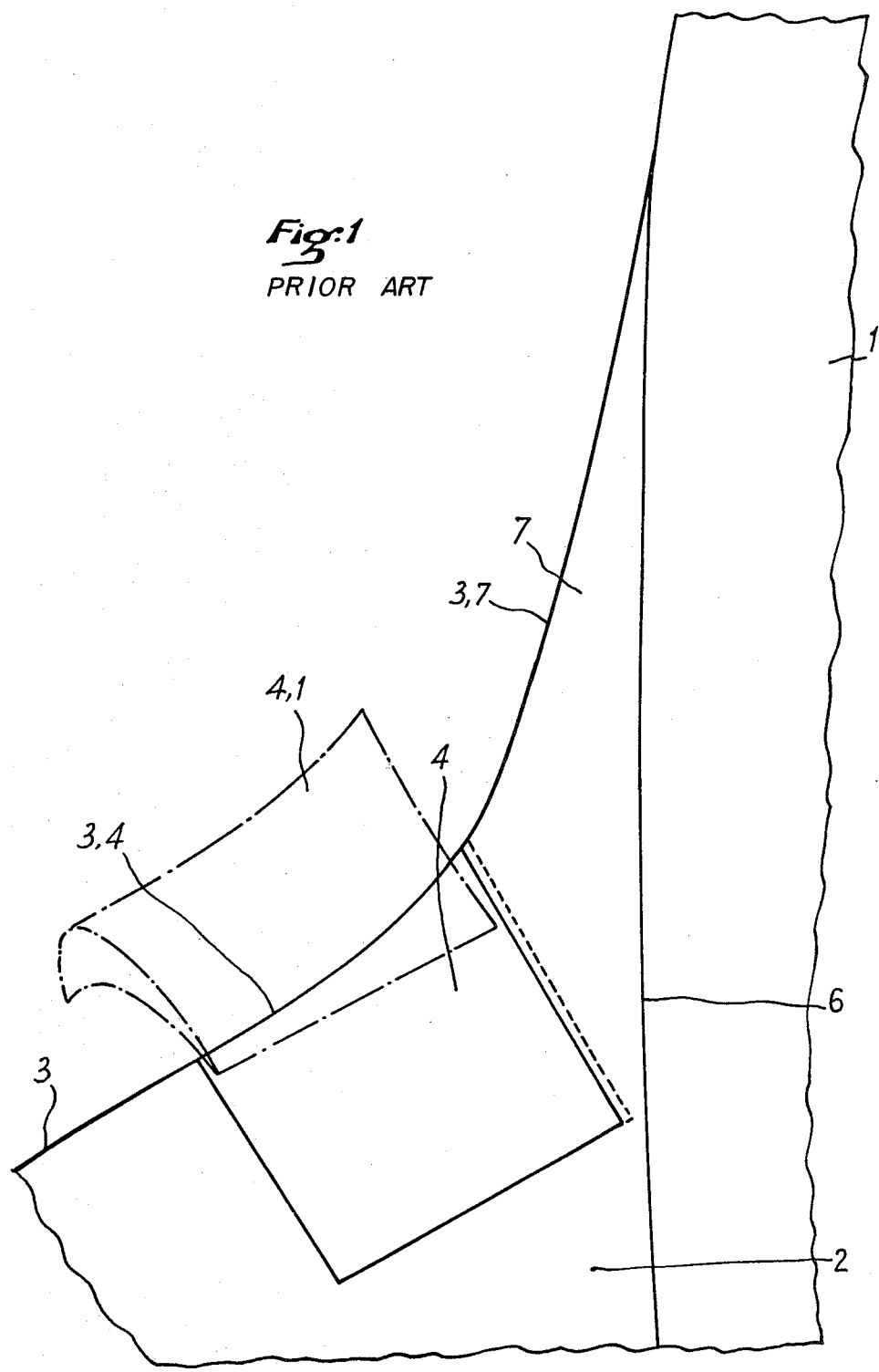
Figure 2:
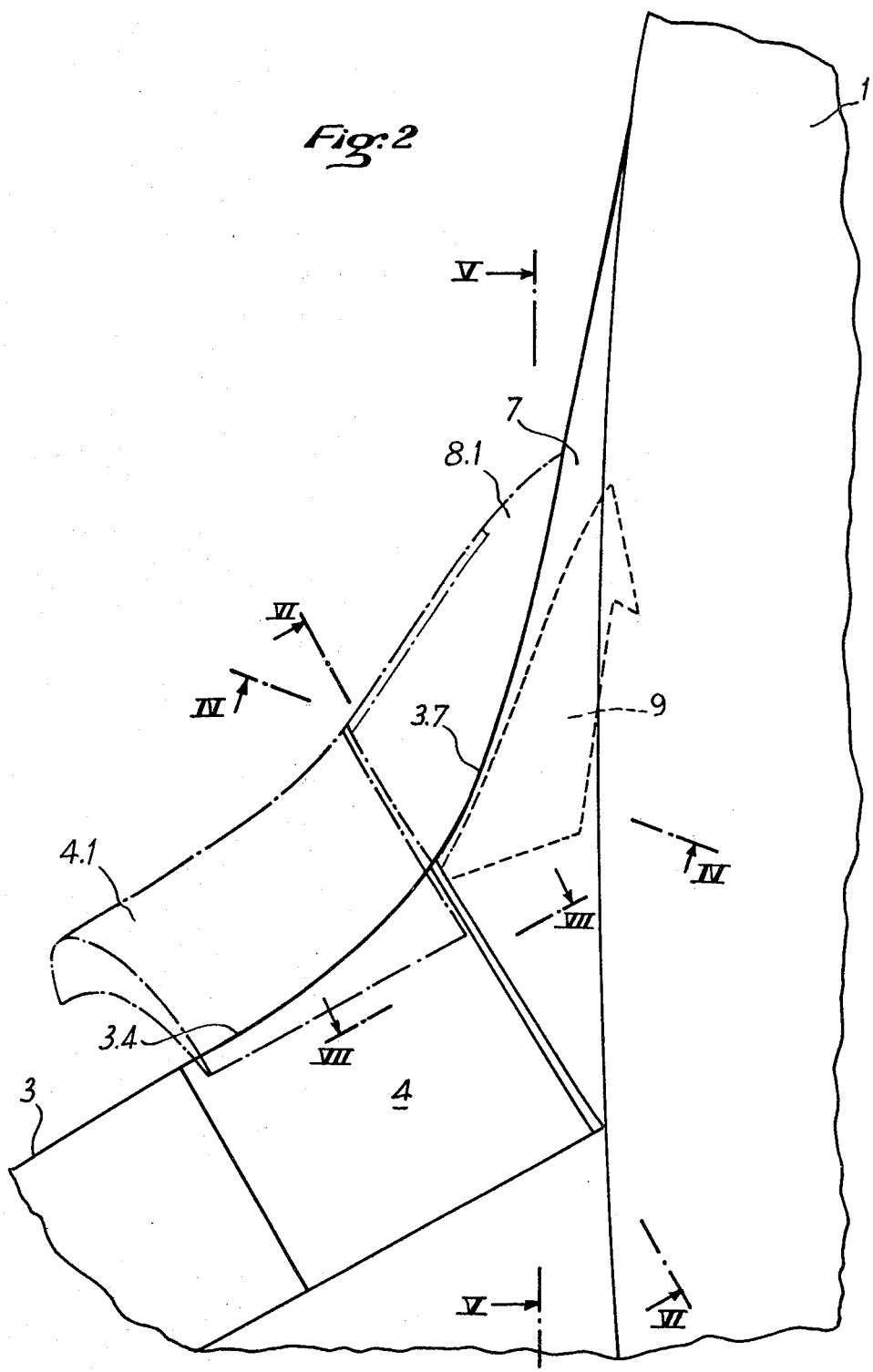

Referring now to the drawings, FIG. 1 shows in plan view part of the fuselage 1 of a wide-body aircraft, at the root of a wing 2, on the leading edge 3 side. In known manner, the wing 2 comprises a high-lift spoiler 4 disposed in a housing 5 (cf. FIG. 3) made in a part of the leading edge and the upper surface of the wing 3. In folded position, the high-lift spoiler 4 forms the part of the leading edge and the upper surface of the wing 3 corresponding to the housing 5. This folded position of the high-lift spoiler 4, in its housing 5 corresponds to normal, high speed flight.

Figure 6:
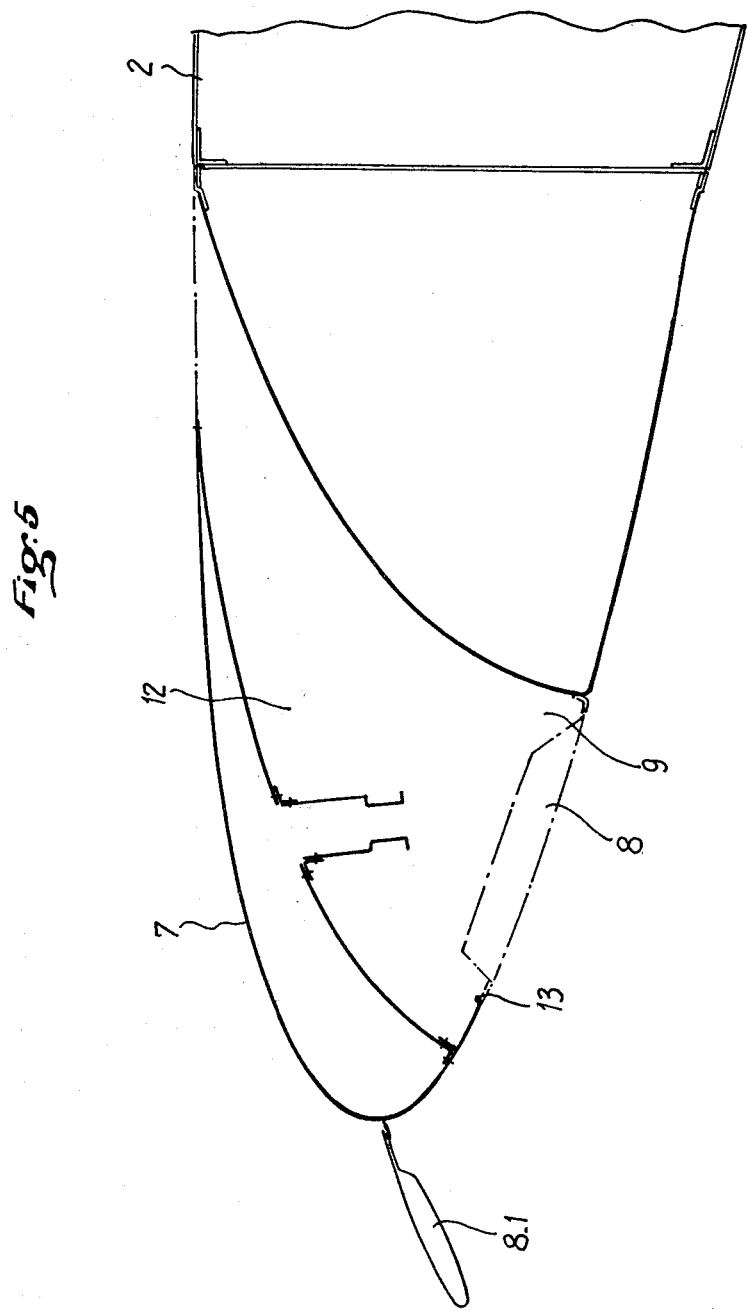

In known manner, during low-speed flight, for example upon take-off or landing of the aircraft, the spoiler 4 may take an extended position $4_1$ (cf. the position in dashed and dotted lines in FIG. 1), in which the spoiler 4 projects forwardly of the leading edge 3 and forms an air flow slot between its lower surface and the upper surface of the wing. Such a slot 16 may be seen in FIG. 6.

The wing 2 is connected to the fuselage substantially along a line 6 and, between the spoiler 4 and the fuselage 1 there is provided, on the leading edge side, a connecting volume or fairing element 7.

Thus, when the spoiler 4 is in folded position, the leading edge 3 is constituted, on the fuselage side, on the one hand by a portion 3.7 corresponding to the fairing element 7 and a portion 3.4 corresponding to the spoiler 4.

It is seen that, when the high-lift spoiler 4 is in extended position, there is a discontinuity of the leading edge between the fuselage and this flap, since the portion 3.7 of the leading edge of the fairing element is fixed, whilst the portion 3.4 of the leading edge of the spoiler 4 projects forwardly.

Figure 3:
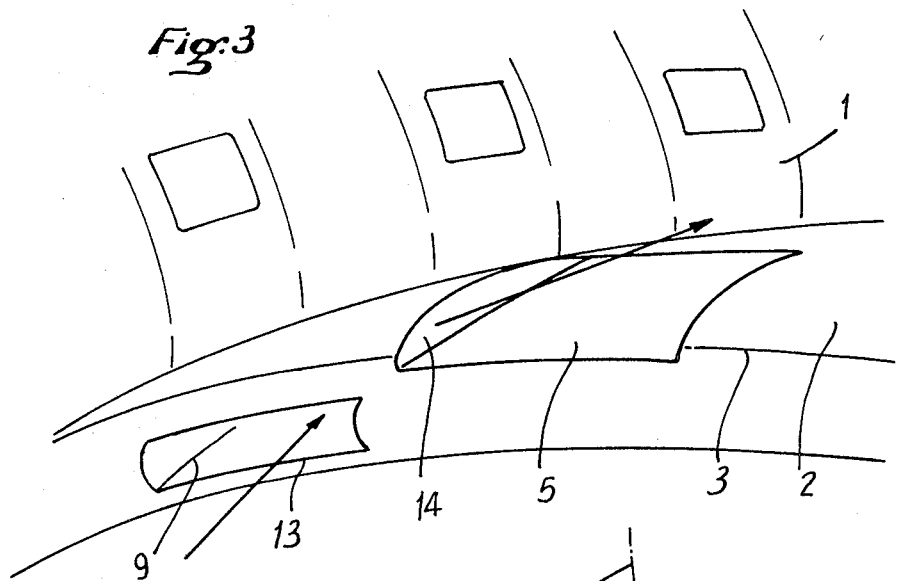
FIG. 3 is a front view, in perspective, of the leading edge of FIG. 2.

To remedy the drawbacks of reduced performances resulting therefrom, a streamlining flap 8 is provided according to the invention, disposed in a housing 9 made in the leading edge 3.7 and in the lower surface of the fairing element 7 (cf. likewise FIG. 3). This streamlining flap 8 is movable between a folded position in which it is disposed in its housing 9 and forms the corresponding part of the leading edge and the lower surface of the fairing element 7 and an extended position 8.1 in which it ensures continuity of the leading edge between the fuselage 1 and the spoiler 4, also in extended position 4.1.

Figure 4:
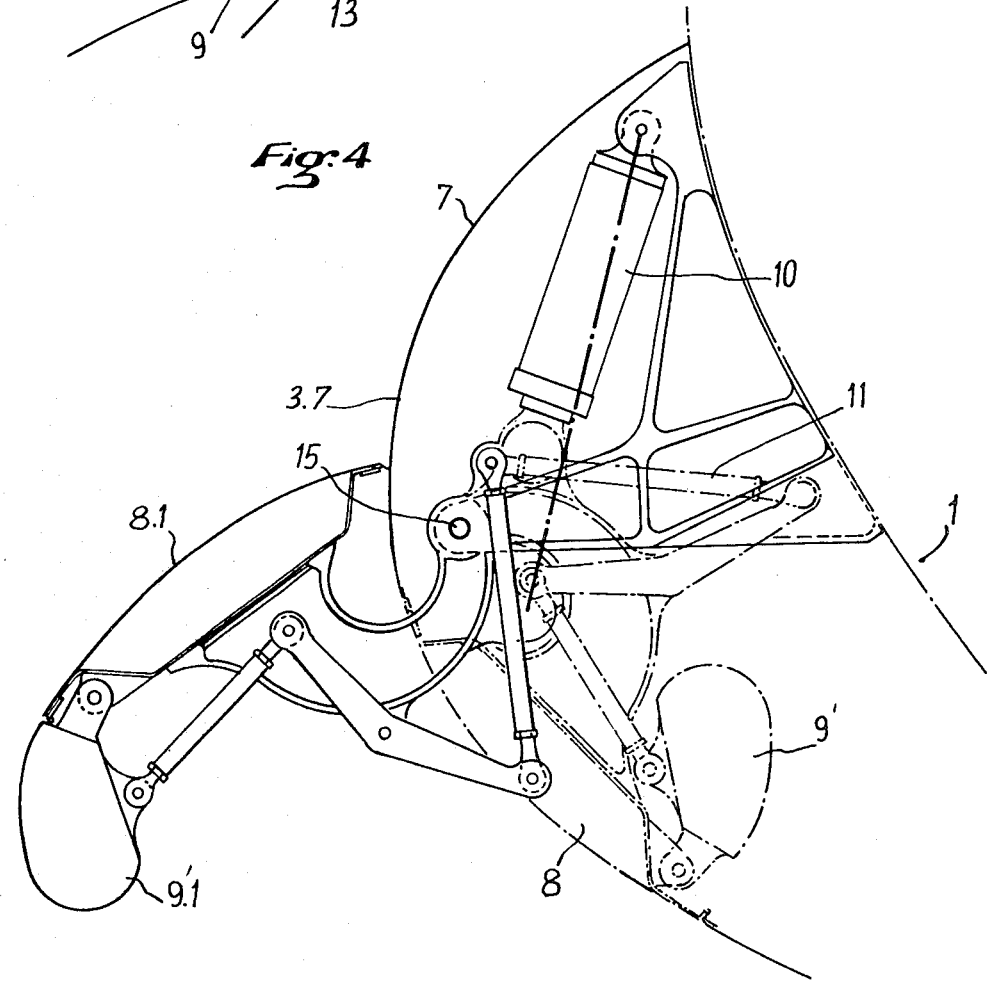

FIG. 4 shows the streamlining flap 8 in extended position 8₁ and in retracted position. This streamlining flap 8 comprises a main flap and a foldable hinged element 9'. Under the action of a mechanism 10 and a linkage 11, the flap 8 may pass from its folded position to its extended position 8₁, whilst, simultaneously, the element 9' passes from its folded position with respect to the flap 8 to its extended position 9'₁. Due to the presence of the element 9', it is possible to follow the curvature of the spoiler 4 so as to ensure the best possible continuity between the fuselage and this spoiler 4.

Furthermore, as shown schematically in FIG. 3, where it has been assumed that the streamlining flap 8 and the high-lift spoiler 4 were eliminated, in order to show their respective housings 9 and 5, there is a communication between the housing 9 and the housing 5, for the air penetrating in the housing 9 when the streamlining flap 8 is in extended position 8₁, to emerge, via housing 5, when the high-lift spoiler 4 is also in extended position. As shown in FIGS. 5 and 7, there is a communication airflow 12 between housings 9 and 5.

The airflow 12 begins at opening 13 of the housing 9 in the leading edge part of the wing 2 and opens in the wall 14 of the housing 5, close to the fuselage 1. This opening 13 of the housing 9 extends substantially from the fuselage 1 to the high-lift spoiler 4, whilst the wall 14 of the housing 5 extends substantially from the leading edge up to the fuselage.

It is thus possible to ensure upper surface blowing of the wing 2, up to the fuselage 1.

It is thus seen that, due to the invention, it is possible to ensure, at low speed of the aircraft, the continuity of the leading edge between the fuselage and the spoiler 4 and, moreover, upper surface blowing.

The control 10/11 of the streamlining flap 8 may be connected to that (not shown as it is known) of the high-lift spoiler 4, or may be independent thereof.

As may be seen in FIG. 4, the flap 8 is hinged about a pin 15 located in the volume of the fairing element 7 and which allows an upward manoeuvre to extend the flap 8 into position 8₁ and a reverse manoeuvre to return the flap into its housing 9.

What is claimed is:

1. In an aircraft wing provided in its leading edge, with a high-lift system of which part is disposed in the vicinity of the join of said wing to the fuselage of the aircraft, but separated from said fuselage by a fairing element improving the air flow on the zone of connection of said wing when it is in smooth configuration, said system comprising at least one high-lift spoiler movable between a folded position in which it is housed in a recess in the wing and forms part of the leading edge and the part adjacent the upper surface of said wing and an extended high-lift position in which said spoiler projects forwardly of said leading edge, making an air blowing slot between its lower surface and the upper surface of said wing on the one hand, said fairing element comprises, in its leading edge, a streamlining flap movable between a folded position in which it is housed in a recess in the fairing element and forms a part of the leading edge and the part adjacent the lower surface of said fairing element, and an extended position in which it ensures continuity of the leading edge between the fuselage and the high-lift spoiler likewise in extended position on the other hand, a communication is provided between the housing of the streamlining flap and the housing of the high-lift spoiler so that, when these two flap elements are in their extended positions, the air penetrating in the housing of the streamlining flap disposed on the lower surface side emerges through the housing of the high-lift spoiler disposed on the upper surface side, with the result that there is an increased upper surface blowing.

2. The aircraft wing of claim 1, wherein the opening of the streamlining flap housing in the leading edge extends substantially from the fuselage to the high-lift spoiler, communication between the two housings is made through almost the whole of the wall of the housing of the high-lift spoiler adjacent the fairing element and this wall extends substantially from the leading edge up to the fuselage.

3. The aircraft wing of claim 1, wherein the control of the streamlining flap is connected to that of the high-lift spoiler.

4. The aircraft wing of claim 1, wherein the control of the streamlining flap is independent of that of the high-lift spoiler.

5. The aircraft wing of claim 1, wherein the streamlining flap comprises at least one hinged element foldable in folded position.

6. The aircraft wing of claim 1, wherein communication between the housing of the streamlining flap and the housing of the high-lift spoiler is constituted by a sectioned airflow.

7. A fixed wing aircraft comprising two wings as specified in claim 1, symmetrical with respect to the longitudinal axis of the fuselage.

* * * * *